Patented Nov. 26, 1935

2,022,243

UNITED STATES PATENT OFFICE 2,022,243

AZO DYE

Werner Lange, Dessau-Ziebigk in Anhalt, Germany, assignor to General Aniline Works, Inc., New York, N. Y., a corporation of Delaware No Drawing. Application November 19, 1932, Serial No. 643,531. In Germany February 15, 1932

19 Claims. (Cl. 260—81)

My present invention relates to new azo dyes and more particularly to those azo dyes which are especially valuable for dyeing leather in an acid dyeing bath.

A further object of my invention is a process for manufacturing the new dyes.

According to my invention valuable azo dyes can be produced by coupling any diazo compound with a triazole (pseudoazimino compound) of the general formula

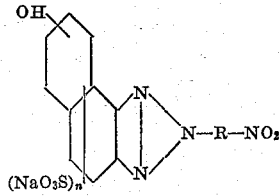

wherein R is a phenyl or naphthyl radicle substituted by at least one nitro group and containing, if desired, further substituents such as a sulfonic acid or carboxylic acid radicle, halogen, a substituted or unsubstituted amino group (acylamino-, alkyl or phenylamino group), an alkyl, hydroxy or alkoxy group, and wherein $n$ means 1 or 2.

These triazoles are obtainable, for instance, by combining in an acid medium an aminohydroxynaphthalene sulfonic acid with a diazotized nitrophenylamine or nitro-naphthylamine which may be substituted as indicated above, and by oxidizing the intermediate product thus obtained.

The dyes obtainable when coupling these hydroxytriazoles in an alkaline medium with a diazo compound dye leather in an acid bath from red to black tints of an outstanding good fastness.

The following examples serve to illustrate the invention, the parts being by weight:—

Example 1.—13.8 parts of 1-amino-4-nitrobenzene are diazotized in the known manner and added to a solution of 26.1 parts of sodium-2-amino-5-hydroxynaphthalene-7-sulfonate kept acid by hydrochloric acid and stirred for about one hour until the acid coupling has finished. Then the reaction mixture is made alkaline by addition of sodium carbonate or caustic soda; 25 parts of calcined soda are further added and the whole is heated until boiling. To the boiling solution a solution of 55 parts of crystallized copper sulfate is slowly added and the mixture is kept boiling until the color change from violet to yellow has become complete.

Instead of copper sulfate 12.5 parts of hydrogen peroxide of 30% strength may be used for oxidizing in the presence of a small amount of copper sulfate acting as a catalyst. The yellow solution of the sodium-4'-nitrophenyl-5-hydroxynaph-1,2-triazole-7-sulfonate thus obtained corresponds to the formula

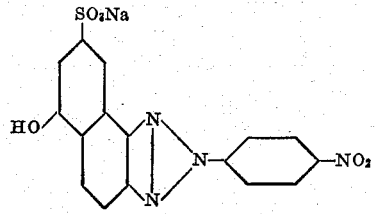

it may be used directly for being coupled with a diazo compound as may be seen from the following:

17.3 parts of 1-aminobenzene-4-sulfonic acid are diazotized in the usual manner and the diazo compound is allowed to run while cooling into the yellow solution of the above mentioned triazole compound (containing about 40 parts of the latter) kept alkaline by the presence of sodium carbonate. The coupling finished, common salt is added and the separated dye is worked up in the usual manner. It excellently dyes leather tanned with a chromium compound or with a vegetable tanning agent bluish red tints. The colorings have a good fastness to light.

Example 2.—13.7 parts of 2-aminobenzene-1-carboxylic acid are diazotized and coupled as indicated in Example 1 with the triazole described in the foregoing example in a solution containing sodium carbonate. The dye is worked up in the usual manner, it likewise dyes leather bluish red with a somewhat bluer shade than that described in Example 1.

When substituting 2-amino-5-nitrobenzene-1-carboxylic acid for the 2-aminobenzene-1-carboxylic acid used in Example 2, a dye is obtained which dyes leather brownish red tints.

Example 3.—27.7 parts of 4-amino-azo-benzene-4'-sulfonic acid are diazotized in the usual manner and united with the cold alkaline solution of the triazole obtained according to Example 1 from 2-amino-5-hydroxynaphthalene-7-sulfonic acid. The coupling finished, the dye is worked up in the usual manner. It dyes leather tanned with a chromium compound or with a vegetable tanning agent beautiful reddish brown tints of good fastness to light.

When substituting the 4'-nitrophenyl-5-hydroxynaph-1,2-triazole-7-sulfonate by sodium-4'-nitrophenyl-8-hydroxynaph-1,2-triazole-6-sulfonate a similar dye is obtained dyeing leather nearly identical tints.

Example 4.—23.4 parts of 6-nitro-2-amino-1-hydroxybenzene-4-sulfonic acid are diazotized in the usual manner and the diazo compound is united with an alkaline solution of the triazole compound made from 2-amino-5-hydroxynaphthalene-7-sulfonic acid. The mixture is stirred until the diazo compound has disappeared. The dye worked up in the usual manner dyes wool black tints which become fuller and fast by an after-treatment with a chromium compound.

*Example 5.*—19.9 parts of 2-amino-4,6-dinitro-1-hydroxybenzene are diazotized in the usual manner and united with the alkaline solution of the triazole made from 2-amino-5-hydroxynaphthalene-7-sulfonic acid described in Example 1. The dye formed in this manner is worked up as described in Example 1. It dyes leather tanned with chromium compounds deeply black.

*Example 6.*—19.9 parts of 2-amino-4,6-dinitro-1-hydroxybenzene are diazotized in the usual manner and united with a soda alkaline solution of sodium-4'-nitrophenyl-8-hydroxynaph-1,2-triazole-4-sulfonate made from 2-amino-8-hydroxynaphthalene-6-sulfonic acid and 1-amino-4-nitrobenzene in the manner described in Example 1. The coupling finished, the dye is worked up as usual. It dyes chrome leather likewise deeply black with a somewhat greener shade than that obtainable according to Example 5.

*Example 7.*—19.9 parts of 2-amino-4,6-dinitro-1-hydroxybenzene are diazotized as usual and coupled in a soda alkaline solution with sodium-3'-nitrophenyl-8-hydroxynaph-1,2-triazole-4-sulfonate made from 1-amino-8-hydroxynaphthalene-4-sulfonic acid and diazotized 1-amino-3-nitrobenzene under the conditions indicated in Example 1, said triazole corresponding to the formula

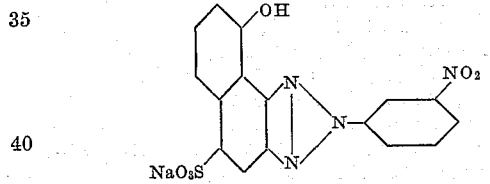

The coupling finished, the dye is worked up as usual. It dyes leather dark green tints. The dye baths are nearly exhausted.

*Example 8.*—The amino azo dye obtainable by diazotizing 32.5 parts of 2-aminonaphthalene-4,8-disulfonic acid and coupling with 1-aminonaphthalene is further diazotized and the diazo compound is united with the soda alkaline solution of the triazole obtainable according to Example 1 from 2-amino-5-hydroxynaphthalene-7-sulfonic acid. The coupling finished, the dye is worked up in the usual manner. It dyes leather corinth tints and has good exhausting properties.

*Example 9.*—19.9 parts of 2-amino-4,6-dinitro-1-hydroxybenzene are diazotized in the usual manner and united with a soda alkaline solution of 46.9 parts of sodium-2'-hydroxy-3',5'-dinitrophenyl-5-hydroxynaph-1,2-triazole-7-sulfonate corresponding to the formula

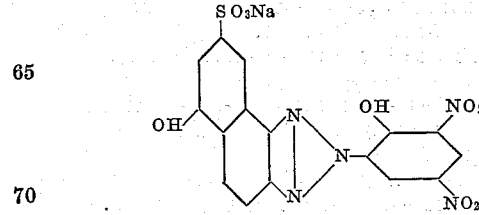

obtained by coupling 2-amino-4,6-dinitro-1-hydroxybenzene in an acid medium with 2-amino-5-hydroxynaphthalene-7-sulfonic acid and by boiling with copper sulfate. The coupling finished, the dye is worked up in the usual manner. It dyes leather black tints.

*Example 10.*—51 parts of sodium-3'-nitrophenyl-8-hydroxynaph-1,2-triazole-3,6-disulfonate of the formula

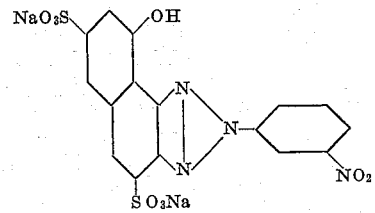

(obtainable from 1-amino-8-hydroxynaphthalene-3,6-disulfonic acid and 1-amino-3-nitrobenzene) are dissolved in water together with 18 parts of sodium carbonate. A solution of 13.8 parts of diazotized 4-nitro-1-amino-benzene is allowed to run while cooling and stirring to the solution of the hydroxynaphtriazole. The coupling finished, the dye is salted out and worked up in the usual manner. It dyes chrome leather and leather dyes with vegetable tanning agents bluish red tints.

When substituting for the 4-nitro-1-aminobenzene the same quantity of 3-nitro-1-aminobenzene a dye is obtained which dyes leather yellowish red tints.

It is obvious that my invention is not limited to the foregoing examples nor to the specific details given therein. Thus, I may use as starting material the 3'-nitro-6'-carboxyphenyl-8-hydroxynaph-1,2-triazole-6-sulfonic acid corresponding as sodium salt to the formula

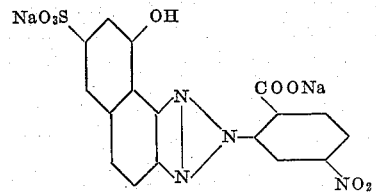

which yields when coupled in an alkaline medium with 4-diazoazobenzene-4'-sulfonic acid a dye which dyes leather red brown tints.

4'-nitro-2'-sulfophenyl-5-hydroxynaph-1,2-triazole-7-sulfonate of the formula

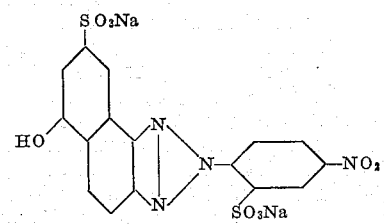

yields when coupled with diazotized 4-aminobenzene sulfonic acid a dye which dyes leather likewise red brown.

The hydroxy triazole of the formula

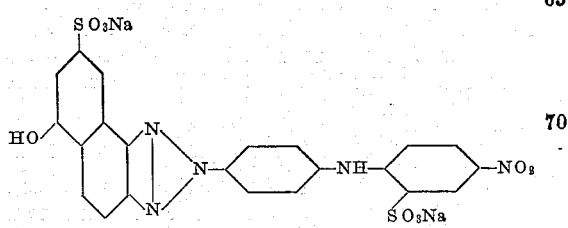

(obtained by diazotizing 4-nitro-4'-aminodiphenylamine-2-sulfonic acid, coupling with 2-amino-5-hydroxynaphthalene-7-sulfonic acid in an acid medium and by oxidizing the product thus obtained) may be coupled in an alkaline medium with diazotized picramic acid, whereat a dye is obtained which dyes chrome leather black brown tints.

2'-hydroxy-3'-nitro-4'-sulfophenyl-5-hydroxy-naph-1,2-triazole-7-sulfonic acid of the formula

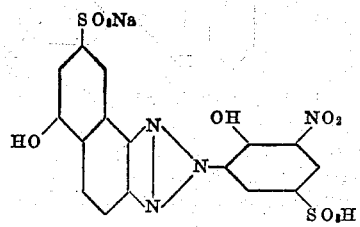

may be combined in an alkaline medium with diazotized picramic acid. The dye formed dyes leather violet tints.

A hydroxy triazole of the formula

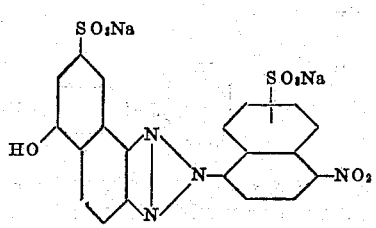

may be prepared in the manner described above from 1-amino-4-nitronaphthalene-6- or 7-sulfonic acid and 2-amino-5-hydroxynaphthalene-7-sulfonic acid. This triazole shows in aqueous solution a brown color. It yields when coupled in an alkaline medium with diazotized picramic acid a dye which dyes leather violet black tints.

When monodiazotizing 4-nitro-1,3-diaminobenzene and coupling the monodiazo compound with 2-amino-5-hydroxynaphthalene-7-sulfonic acid in an alkaline medium, a triazole is obtainable by oxidation of the azo dye formed which corresponds to the formula

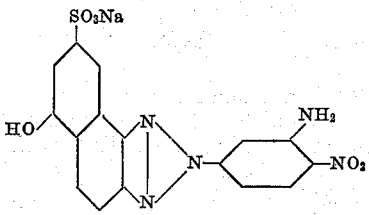

When coupling this triazole with diazotized 4-aminoazobenzene-2-sulfonic acid a dye is prepared which dyes leather red brown tints.

From the foregoing it may be seen that the triazoles in question may be substituted in a manifold manner. However, the number of possible substitutions is not exhausted by the examples and other substituents such as halogen, alkyl, or alkoxy groups, substituted or unsubstituted amino groups may be contained in the nucleus bound to the triazole radicle.

The same holds true with regard to the azo component; besides those indicated in the examples other diazo compounds generally used in the manufacture of azo dyes may be employed for being coupled with the hydroxytriazoles in question.

By these substitutions the general character of my new dyes, viz.—their excellent capacity for dyeing leather in an acid bath red to black tints of an outstanding good fastness, is not altered. All these substitution possibilities are as equivalents within the scope of my invention and of the claims following hereafter:

What I claim is:—

1. The azo dyes corresponding as sodium salt to the general formula

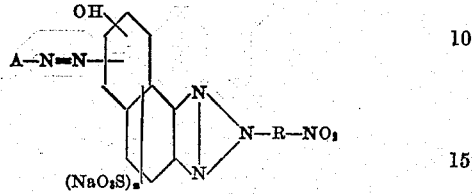

wherein A is the radicle of a diazo component of the benzene or naphthalene series, R is an aromatic radicle of the benzene or naphthalene series and $n$ means 1 or 2, these dyes being in the dry state dark powders which are easily soluble in water and which dye leather in an acid dyeing bath red to black tints of good fastness.

2. The azo dyes corresponding as sodium salt to the general formula

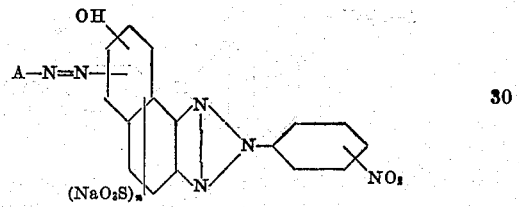

wherein A is the radicle of a diazo component of the benzene or naphthalene series, and wherein $n$ means 1 or 2, these dyes being in the dry state dark powders which are easily soluble in water and which dye leather in an acid dyeing bath red to black tints of good fastness.

3. The azo dyes corresponding as sodium salt to the general formula

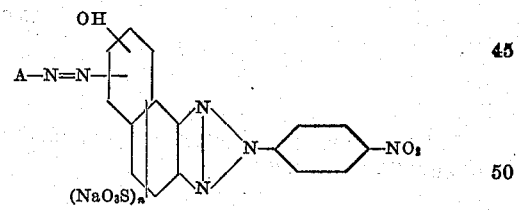

wherein A is the radicle of a diazo component of the benzene or naphthalene series and $n$ means 1 or 2, these dyes being in the dry state dark powders which are easily soluble in water and which dye leather in an acid dyeing bath red to black tints of good fastness.

4. The azo dyes corresponding as sodium salt to the general formula

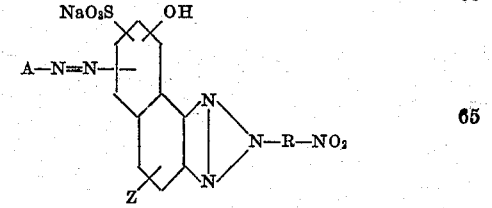

wherein A is the radicle of a diazo component of the benzene or naphthalene series, Z is hydrogen or a sulfonic acid radicle, and R is an aromatic radicle of the benzene or naphthalene series, these dyes being in the dry state dark powders which are easily soluble in water and which dye leather in an acid dyeing bath red to black tints of good fastness.

5. The azo dyes corresponding as sodium salt to the general formula

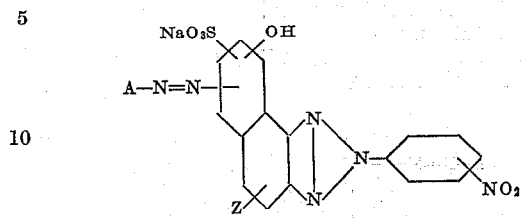

wherein A is the radicle of a diazo component of the benzene or naphthalene series, Z is hydrogen or a sulfonic acid radicle, these dyes being in the dry state dark powders which are easily soluble in water and which dye leather in an acid dyeing bath red to black tints of good fastness.

6. The azo dyes corresponding as sodium salt to the general formula

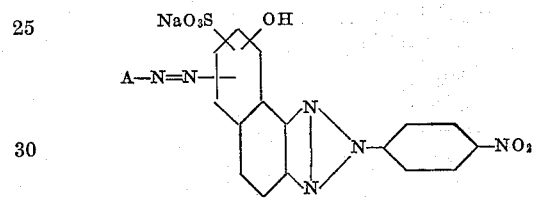

wherein A is the radicle of a diazo component of the benzene or naphthalene series, these dyes being in the dry state dark powders which are easily soluble in water and which dye leather in an acid dyeing bath red to black tints of good fastness.

7. The azo dyes corresponding as sodium salt to the general formula

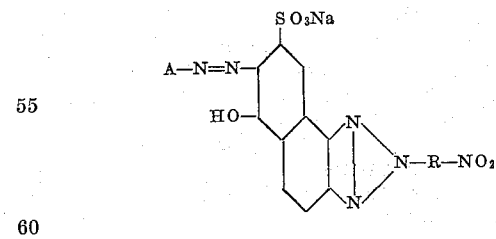

wherein A is the radicle of a diazo component of the benzene or naphthalene series and R is an aromatic radicle of the benzene or naphthalene series, these dyes being in the dry state dark powders which are easily soluble in water and which dye leather in an acid dyeing bath red to black tints of good fastness.

8. The azo dyes corresponding as sodium salt to the general formula

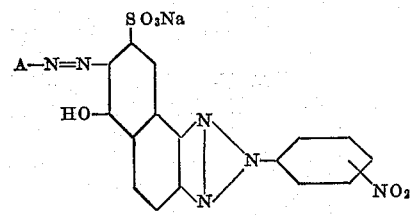

wherein A is the radicle of a diazo component of the benzene or naphthalene series, these dyes being in the dry state dark powders which are easily soluble in water and which dye leather in an acid dyeing bath red to black tints of good fastness.

9. The azo dyes corresponding as sodium salt to the general formula

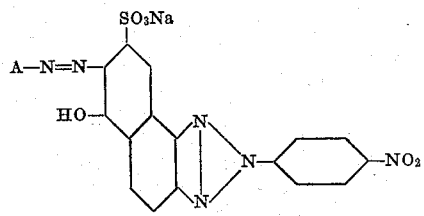

wherein A is the radicle of a diazo component of the benzene or naphthalene series, these dyes being in the dry state dark powders which are easily soluble in water and which dye leather in an acid dyeing bath red to black tints of good fastness.

10. The azo dyes corresponding as sodium salt to the general formula

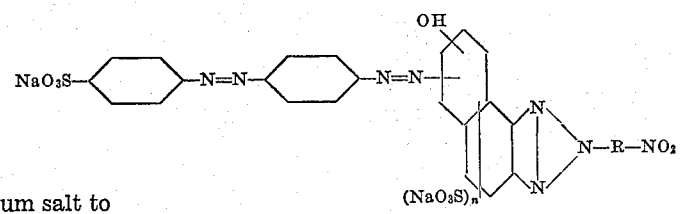

wherein R is an aromatic radicle of the benzene or naphthalene series and $n$ means 1 or 2, these dyes being in the dry state dark powders which are easily soluble in water and which dye leather in an acid dyeing bath red to black tints of good fastness.

11. The azo dyes corresponding as sodium salt to the general formula

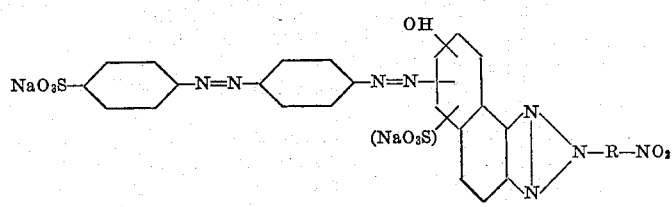

wherein R is an aromatic radicle of the benzene or naphthalene series, these dyes being in the dry state dark powders which are easily soluble in water and which dye leather in an acid dyeing bath red to black tints of good fastness.

12. The azo dye corresponding as sodium salt to the formula

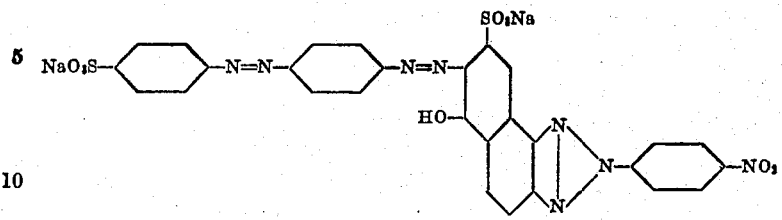

being in the dry state a dark powder, soluble in water and dyeing leather beautiful reddish brown tints of good fastness to light.

13. The azo dye corresponding as sodium salt to the formula

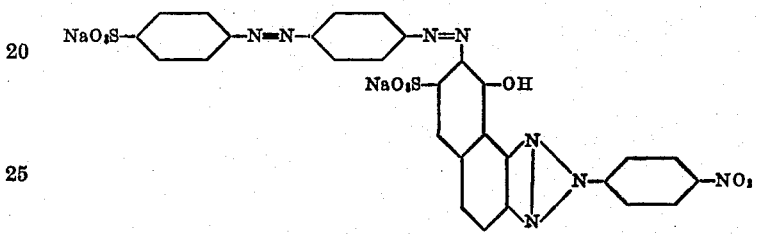

being in the dry state a dark powder, soluble in water and dyeing leather beautiful reddish brown tints of good fastness to light.

14. The azo dye corresponding as sodium salt to the formula

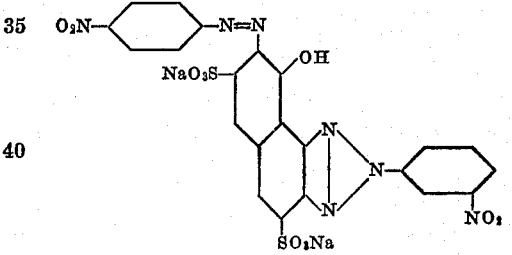

being in the dry state a dark powder, soluble in water and dyeing leather bluish red tints of good fastness to light.

15. The process which comprises coupling in an alkaline medium a diazo compound of the benzene or naphthalene series with a hydroxynaphtriazole of the general formula

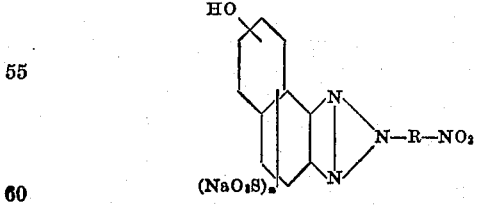

wherein R is an aromatic radicle of the benzene or naphthalene series and $n$ means 1 or 2.

16. The process which comprises coupling in an alkaline medium a diazo compound of the benzene or naphthalene series with a hydroxynaphtriazole of the general formula

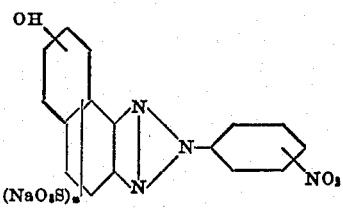

wherein $n$ means 1 or 2.

17. The process which comprises diazotizing 4-amino-azo-benzene-4'-sulfonic acid and coupling the diazo compound in an alkaline medium with 4'-nitrophenyl-5-hydroxynaph-1,2-triazole-7-sulfonic acid.

18. The process which comprises diazotizing 4-amino-azo-benzene-4'-sulfonic acid and coupling the diazo compound in an alkaline medium with 4'-nitrophenyl-8-hydroxynaph-1,2-triazole-6-sulfonic acid.

19. The process which comprises diazotizing 1-amino-4-nitrobenzene and coupling the diazo compound in an alkaline medium with 3'-nitrophenyl-8-hydroxynaph-1,2-triazole-3,6-disulfonic acid.

WERNER LANGE.